(12) United States Patent
Theisen

(10) Patent No.: US 12,709,676 B2
(45) Date of Patent: Aug. 18, 2026

(54) SUSTAINABLE RUBBER COMPOUND FOR POWER TRANSMISSION BELT

(71) Applicant: CONTITECH DEUTSCHLAND GMBH, Hannover (DE)

(72) Inventor: Miles Theisen, Omaha, NE (US)

( * ) Notice: Subject to any disclaimer, the term of this patent is extended or adjusted under 35 U.S.C. 154(b) by 161 days.

(21) Appl. No.: 18/483,235

(22) Filed: Oct. 9, 2023

(65) Prior Publication Data

US 2025/0115744 A1 Apr. 10, 2025

(51) Int. Cl.

*C08L 9/06* (2006.01)
*C08K 3/04* (2006.01)
*F16G 1/08* (2006.01)
*F16G 1/28* (2006.01)
*F16G 5/06* (2006.01)

(52) U.S. Cl.

CPC .................. *C08L 9/06* (2013.01); *C08K 3/04* (2013.01); *F16G 1/08* (2013.01); *F16G 1/28* (2013.01); *F16G 5/06* (2013.01); *C08K 2201/011* (2013.01); *C08L 2201/08* (2013.01); *C08L 2205/025* (2013.01); *C08L 2205/06* (2013.01); *C08L 2205/16* (2013.01); *C08L 2207/322* (2013.01)

(58) Field of Classification Search

None

See application file for complete search history.

(56) References Cited

U.S. PATENT DOCUMENTS 6,407,180 B1 6/2002 Wideman et al.
10,227,479 B2 3/2019 Styer
10,899,914 B2 1/2021 Styer
11,597,820 B2 3/2023 Styer (Continued)

FOREIGN PATENT DOCUMENTS

EP 1217254 B1 9/2006
EP 2584217 A1 4/2013

OTHER PUBLICATIONS

The International Search Report and the Written Opinion of the International Searching Authority mailed on Jan. 3, 2025 for the counterpart PCT Application No. PCT/EP2024/076825.

(Continued)

*Primary Examiner* — Arti Singh-Pandey

(74) *Attorney, Agent, or Firm* — Iken S. Sans; Richard A. Wolf; Gregory Adams

(57) ABSTRACT

An article such as a power transmission belt includes an elastomeric body and at least one reinforcement cord disposed in the elastomeric body. At least part of the elastomeric body is formed from a rubber compound including styrene butadiene rubber (SBR) sustainable polymer. The rubber compound may include additional sustainable materials, such as one or more of additional sustainable rubber, sustainable fiber, sustainable carbon black, sustainable plasticizers, or the like. The rubber compound may have an overall sustainable content of 50% or greater, or even greater than 65%, such as up to about 95% or more total sustainable content for the rubber compound. The article may include further sustainable material, such as sustainable fabrics and/or sustainable reinforcement cords. The overall article may have a total sustainable content of 50% or greater, or up to about 95% or more total sustainable content for the article.

20 Claims, 2 Drawing Sheets

(56) References Cited

U.S. PATENT DOCUMENTS

| | | | | |
|---|---|---|---|---|
| 12,338,339 | B2 * | 6/2025 | Theisen | C08K 5/14 |
| 2011/0028257 | A1 | 2/2011 | Sealey | |
| 2011/0172365 | A1 | 7/2011 | Meredith et al. | |
| 2013/0150488 | A1 | 6/2013 | Feng | |
| 2014/0135437 | A1 | 5/2014 | Sandstrom et al. | |

OTHER PUBLICATIONS

Versalis, Balance ISCC Plus Certified Products, Sep. 2022.

* cited by examiner

SUSTAINABLE RUBBER COMPOUND FOR POWER TRANSMISSION BELT

TECHNICAL FIELD

The present disclosure relates generally to a sustainable rubber compound, and more particularly to a sustainable rubber compound used in a power transmission belt.

BACKGROUND

Power transmission belts are used in a variety of applications to transfer power from one rotating shaft or pulley to another within a machine or system. A typical power transmission belt includes an elastomeric body having an inner pulley engagement section, an outer section, and a load carrying section between the inner and outer sections. The load carrying section typically includes reinforcement cords and provides a majority of the tensile strength to the belt. The inner pulley engagement section of the belt may include longitudinal or transverse grooves or ribs that engage corresponding pulley grooves in the power transmission system. For some belts, groove or rib configurations also may be provided in the outer section of the belt.

SUMMARY

The elastomeric body of a transmission belt is formed from a rubber compound, in which one commonly used rubber in the compound includes styrene butadiene rubber (SBR). SBR is formed from two monomers, styrene and butadiene. Styrene is a hydrocarbon compound derived from petrochemical sources, such as crude oil or petroleum-derived naphtha. It provides rigidity and hardness to the SBR rubber, making it more suitable for certain applications. Butadiene is another hydrocarbon compound derived from crude or naphtha via petrochemical processes such as hydrocarbon cracking. There is an ongoing goal, however, to move away from petroleum-derived materials and instead use sustainable materials for forming rubber compounds.

At least one aspect of the present disclosure solves one or more problems associated with conventional petroleum-derived SBR by providing a rubber compound having SBR sustainable polymer. Such an SBR sustainable polymer may include styrene and/or butadiene monomer derived from sustainable naphtha. The sustainable naphtha may be derived from sustainable sources, such as organic raw materials or biomass feedstocks. This may include sources such as plant-based materials, like sugarcane or corn, vegetable oils, waste fats, organic waste, or agricultural residues.

The rubber compound may include additional sustainable materials, such as one or more of additional sustainable rubber, sustainable fiber, sustainable carbon black, sustainable plasticizers, or the like. The rubber compound may have an overall sustainable content of 50% or greater, or even greater than 65%, such as up to about 95% or more total sustainable content for the rubber compound.

The sustainable rubber compound and/or variations thereof may constitute a majority of the elastomeric body of the article. The article may include further sustainable material, such as sustainable fabrics and/or sustainable reinforcement cords. In exemplary embodiments, the overall article may have a total sustainable content of 50% or greater, or even greater than 65%, such as up to about 95% or more total sustainable content for the article.

According to an aspect, a belt includes: an elastomeric body; and at least one reinforcement cord disposed in the elastomeric body; wherein at least part of the elastomeric body is formed from a rubber compound comprising one or more styrene butadiene rubber (SBR) sustainable polymer(s).

According to another aspect, a rubber compound including: one or more natural rubber(s) in a total amount from 30 phr to 70 phr; one or more SBR sustainable polymer(s) in a total amount from 30 phr to 70 phr; one or more sustainable carbon black(s) in a total amount from 25 phr to 150 phr; one or more sustainable dispersed reinforcing fiber(s) in a total amount from 5 phr to 20 phr; optionally one or more antioxidant(s) in a total amount from 1 phr to 10 phr; and optionally one or more activator(s) in a total amount from 4 phr to 20 phr.

In exemplary embodiment(s), the rubber compound further includes one or more sustainable plasticizer oil(s) in a total amount from about 5 phr to about 20 phr; the one or more sustainable dispersed reinforcing fiber(s) includes cotton having a mean size in a range from 2 mm to 7 mm; and the one or more sustainable carbon black(s) has a mean size in a range from 20 nm to 60 nm and is present in the rubber compound in a total amount from 75 phr to 150 phr.

In exemplary embodiment(s), the rubber compound further includes one or more non-sustainable plasticizer oil(s) in a total amount from 5 phr to 20 phr; the one or more sustainable dispersed reinforcing fiber(s) includes cotton having a mean size in a range from 2 mm to 7 mm; the one or more sustainable carbon black(s) has a mean size in a range from 60 nm to 100 nm and is present in the rubber compound in a total amount from 25 phr to 100 phr; the compound further including one or more additional carbon black(s) having a mean size in a range from 20 nm to 60 nm and is present in the rubber compound in a total amount from 25 phr to 100 phr.

According to another aspect, an article includes an elastomeric body formed from the rubber compound according to any of the foregoing, in particular the elastomeric body having a total sustainable content of greater than 50% by weight based on total elastomeric body weight.

The following description and the annexed drawings set forth certain illustrative embodiments according to the present disclosure. These embodiments are indicative, however, of but a few of the various ways in which the principles of the invention may be employed. Other objects, advantages and novel features according to aspects of the present disclosure will become apparent from the following detailed description when considered in conjunction with the drawings.

BRIEF DESCRIPTION OF THE DRAWINGS

The annexed drawings, which are not necessarily to scale, show various embodiments according to the present disclosure.

DETAILED DESCRIPTION

Figure 1:
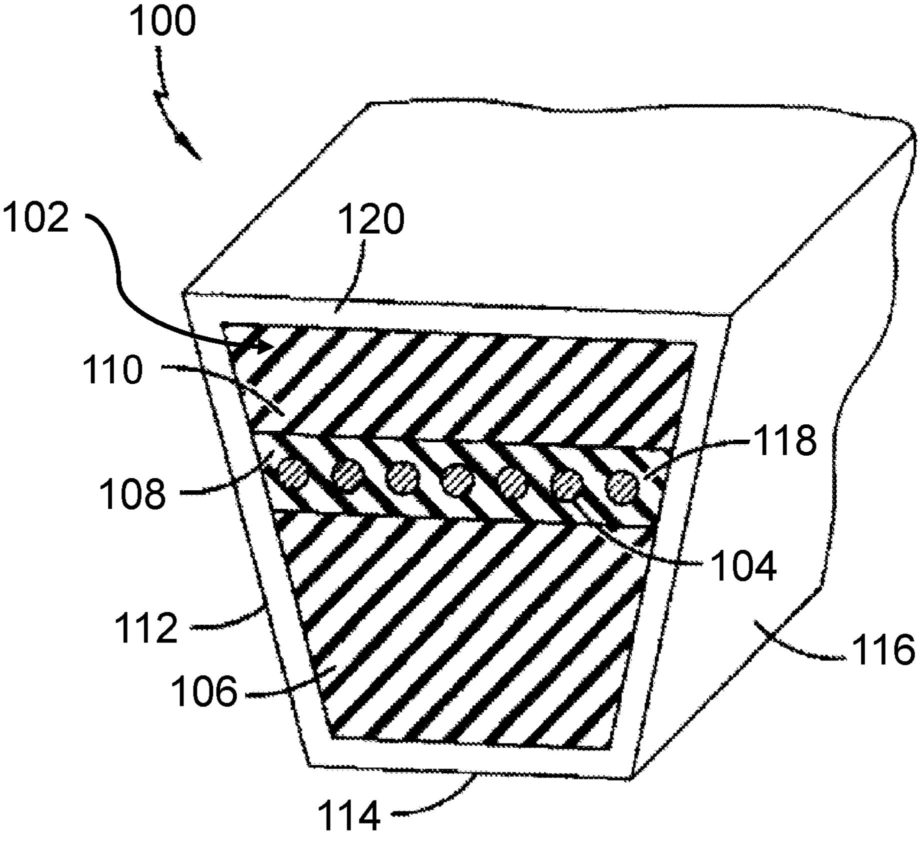
FIG. 1 illustrates a portion of an endless belt in a perspective sectional view, in accordance with an embodiment of the present disclosure.

The principles and aspects according to the present disclosure have particular application to belts, such as endless belts, in particular power transmission belts, and thus will be described herein mainly in this context. It is understood, however, that the principles and aspects of the present disclosure may be applicable to other types of belts for other applications, or to other articles in general, when desirable to provide one or more advantages of the material(s) and/or construction(s) described herein.

Many conventional belts are formed from elastomeric compounds that may include one or more rubbers derived from petrochemical processes. For example, styrene butadiene rubber (SBR) includes styrene and butadiene monomers that may be derived from petroleum-derived naphtha.

Aspect(s) according to the present disclosure provide a unique rubber compound and/or unique article construction using such a rubber compound that includes at least an SBR sustainable polymer. The SBR sustainable polymer may include styrene and/or butadiene monomer derived from sustainable naphtha, which this sustainable naphtha may be derived from renewable sources including organic raw materials, biomass feedstocks, or the like. The unique rubber compound (also referred to herein as the sustainable rubber compound for ease of reference) also may include additional sustainable materials, such as one or more of additional sustainable rubber, sustainable fiber, sustainable carbon black, sustainable plasticizers, or the like, as described in further detail below.

The term "sustainable material" as used herein is in accordance with its ordinary and customary meaning. As such, a "sustainable material" is one in which that material or raw material(s) that make that material are from sustainable source(s). A sustainable source is a renewable source and/or a recycled source. A renewable source is one that can be replenished through sustainable practices, including, for example, natural or biomass materials, such as plant-based materials. A recycled source uses old material to reduce the demand of new raw materials. In general, sustainable materials reduce the negative impact on the environment, and thus generally are not derived from mining sources or petrochemical sources, including oil or natural gas, or the like.

Generally, the sustainable rubber compound having the SBR sustainable polymer may be used in a reinforced elastomeric article having an elastomeric body and at least one reinforcement cord within the elastomeric body. In exemplary embodiments, the unique sustainable rubber compound may have one or more material properties making it particularly suitable for use in an article such as an endless power transmission belt, or a belt for other applications, such as a conveyor belt. These article(s), including belt(s), may have one or more sections or portions of the elastomeric body that is/are configured for the application, and the sustainable rubber compound according to the present disclosure may be used in one or more or all of these different sections or portions depending on the application.

As described in further detail below with exemplary reference to FIGS. 1-3, the elastomeric body of an endless belt may include an inner engagement section, an outer section, and a load carrying section between the inner and outer sections. The load carrying section typically includes reinforcement cords (also referred to as tensile cords) and provides a majority of the tensile strength to the belt. The outer section (also referred to as the cover, backing or spine section) overlies at least the load carrying section and provides protection to the load carrying section having the reinforcement cords. The inner engagement section underlies the load carrying section and experiences compressive load from the pulleys/sheaves or other component of the power transmission system. As such, the inner engagement section is also referred to as a compression section, or cushion section, and distributes load to the reinforcement cords. The inner engagement section of the belt may include longitudinal or transverse grooves or ribs that engage corresponding pulley/sheave grooves in the power transmission system. According to exemplary embodiment(s) of the present disclosure, the sustainable rubber compound may form at least part or all of any or all of these sections of the belt.

The exemplary sustainable rubber compound may include the SBR sustainable polymer, one or more additional polymers, and various additives, each of which may be of any suitable type and in any suitable amount to form the desired article, such as an endless power transmission belt, according to the desired application.

For example, the one or more additional polymers in the sustainable rubber compound may include, for example, natural rubber (NR), epoxidized natural rubber (ENR), polybutadiene rubber (BR), acrylonitrile butadiene rubber (NBR), carboxylated nitrile rubber (XNBR), (partially) hydrogenated nitrile rubber (HNBR), additional (non-sustainable) styrene butadiene rubber (SBR), carboxylated styrene-butadiene rubber (XSBR), styrene/ethylene-butylene/styrene-based (SEBS), ethylene propylene monomer (EPM), ethylene propylene diene monomer (EPDM), chloroprene rubber (CR), isoprene rubber (IR), butyl rubber (IIR), bromobutyl rubber (BIIR), chlorobutyl rubber (CIIR), chlorinated polyethylene (CPE), chlorosulfonated polyethylene (CSM), alkylated chlorosulfonated polyethylene (ACSM), polyepichlorohydrin rubbers (CO; ECO; ETER), ethylene-vinyl acetate rubber (EVA), acrylate rubber (ACM), ethylene-acrylate rubber (AEM), silicone rubber (MQ, VMQ, PVMQ, FVMQ), fluorine rubber (FKM), fluorinated methylsilicone rubber (MFQ), perfluorinated propylene rubber (FFPM), perfluorocarbon rubber (FFKM), thermoplastic elastomers (TPE), thermoplastic vulcanizates (TPV), thermoplastic polyurethanes (TPU), polyolefin elastomers (POE), polyvinylchloride (PVC), and/or polyurethane (PU), and/or the like, or blends thereof. Generally, the total polymer/elastomer/rubber content (including polymer/rubber/elastomer mixtures) may serve as the baseline for the compound set at 100 parts per hundred (phr). As used herein, the term parts per hundred (phr) means parts per 100 parts of the base polymer/elastomer/rubber.

The various additives in the sustainable rubber compound may be functional or inert. For example, the one or more additives may include: fillers or reinforcement agents (e.g., carbon blacks, silicas, calcium carbonates (chalk), kaolin (clays), aluminum silicates, calcium silicates, magnesium silicates (talc), or other minerals, or mixtures thereof); dispersed reinforcement fiber (e.g., chopped or spun (short) fiber formed from natural or synthetic material, such as cotton fiber, glass fiber, aramid fiber, polyester fiber, nylon fiber, mineral fiber, etc., or mixtures thereof); plasticizers, softeners, chain extending oils (e.g., mineral oils, paraffinic oils, naphthenic oils, polymer plasticizers, ester plasticizers, phthalate plasticizers, vegetable oils, epoxidized oils, or the like, or mixtures thereof); curing/vulcanizing agents or systems (e.g., sulfur, peroxides, or the like, or mixtures thereof); accelerators, activators (e.g., thiazoles, carbamates, sulfides, sulfenamides, stearic acids, metal oxides such as zinc oxide, etc., or mixtures thereof); retardants (e.g., carboxylates, resorcinol, cyclohexylthiophthalimide, etc., or mixtures thereof); antioxidants, antiozonants, stabilizers (e.g., phenolics, amines, phosphites, waxes, zinc oxide, etc., or mixtures thereof); flame retardants (e.g., antimony trioxide, aluminum hydroxide, magnesium hydroxide, organophosphorus compounds, halogenated compounds, intumescent materials such as intercalated graphite, etc., or mixtures thereof); anti-static agents (e.g., conductive fibers or fillers such as conductive carbon black, graphite, metallic powders, carbon nanotubes, graphene, etc., or mixtures thereof); coupling agents, adhesion promoters, tackifiers (e.g., silanes, titanates, rosins, hydrocarbon resins, etc., or mixtures thereof); pigments, dispersants, dyes and other colorants, or opacifying agents; various processing aids, flow modifiers, emulsifiers, thickeners, foaming or anti-foaming agents, wetting agents or surfactants; and/or any other suitable additive that may be added separately or in any suitable combination with the foregoing. It is of course understood that one or more of these additives may have multiple functions. Such additives may be added in various amounts, and the total additive content in the rubber compound may be in a relatively wide range from about 20 phr to about 700 phr, for example. As an example, reinforcing agents may be present in an amount from about 50 phr to about 400 phr; and plasticizers such as oils may be present in a range from about 10 phr to about 200 phr. The formulation of the material may be compounded in a conventional mixing apparatus as an admixture of the rubber and additive components, and may be processed into the article (e.g., belt) according to conventional techniques.

In exemplary embodiments, the sustainable rubber compound for a belt, such as an endless belt, for example a power transmission belt, includes the SBR sustainable polymer, at least one additional polymer, reinforcing filler(s), dispersed reinforcing fiber(s), antioxidant(s), accelerator(s), and curative(s). Each of these ingredients of the exemplary sustainable rubber compound will be described in further detail below for sake of clarity and not limitation.

Base Polymer

The one or more polymers of the compound form the matrix and serve as the base of the composition. As such, the total polymer content forming the base compound is about 100 phr. This total amount can be divided among one or more different types of polymer, such as different types of rubbers, as may be desired for the particular application. In exemplary embodiments, the different rubbers forming the base of the sustainable rubber compound include at least one SBR sustainable polymer and at least one sustainable natural rubber (NR), which together may total 100 phr of the rubber compound.

The SBR sustainable polymer in the rubber compound provides elastomeric properties including durability and versatility. The SBR sustainable polymer includes styrene and butadiene monomers, one or both of which are derived from sustainable naphtha. The sustainable naphtha may be derived from sustainable sources, such as organic raw materials or biomass feedstocks. This may include sources such as plant-based materials, like sugarcane or corn, vegetable oils, waste fats, organic waste, or agricultural residues. In exemplary embodiments, the sustainable naphtha chosen for the sustainable rubber compound is derived from plant-based material or vegetable oil to maintain desirable properties of the overall compound. Generally, the production of sustainable naphtha may involve processes like biomass conversion, pyrolysis, or fermentation to extract and refine the hydrocarbons from these renewable sources.

The SBR sustainable polymer(s) may be present in the compound in any suitable amount. For example, the total amount of SBR sustainable polymer(s) present in the rubber compound may be in a range from about 30 phr to about 70 phr, more particularly from about 40 phr to about 65 phr, or even more particularly from about 50 phr to about 65 phr, such as about 30, 35, 40, 45, 50, 55, 60, 65, or 70 phr (including all values and ranges between the stated values). If too much SBR sustainable polymer (or SBR polymer in total) is in the rubber compound, such as greater than the above-identified range(s), then the rubber compound may be too stiff and not have enough elongation for the desired application, such as for an endless belt. The opposite is the case if too little SBR (sustainable) polymer is present, such as less than the above-identified range(s).

The natural rubber (NR) in the rubber compound also provides elastomeric properties and flexibility. The natural rubber is derived from plant-based material (e.g., rubber tree, dandelion, or other latex producing plant) and therefore also is a sustainable material.

The NR sustainable polymer(s) may be present in the rubber compound in any suitable amount, such as in a range from about 30 phr to about 70 phr, more particularly from about 30 phr to about 50 phr, or even more particularly from about 35 phr to about 45 phr, such as about 30, 35, 40, 45, 50, 55, 60, 65, or 70 phr (including all values and ranges between the stated values). If too much NR sustainable polymer is in the rubber compound, such as greater than the above-identified range(s), then the rubber compound may have too high of an elastic modulus or may have too high much elongation for the desired application, such as for an endless belt. The opposite is the case if too little NR polymer is present, such as less than the above-identified range(s). Generally, the NR content may be less than the SBR content.

The NR sustainable polymer may have different mechanical properties than the SBR sustainable polymer, such as lower modulus of elasticity, lower tensile strength, and greater elongation. Therefore, in an exemplary rubber compound for a belt, such as a power transmission belt, the rubber compound may have a greater proportion of total SBR sustainable polymer(s) compared to total NR sustainable polymer(s). This can maintain the desired balance of material characteristics of the rubber compound, such for a belt, while also maintaining a high-level of sustainable content of the rubber compound.

It is understood that the sustainable rubber compound may have additional base polymer(s), which may or may not have sustainable content; or the only base polymers in the exemplary sustainable rubber compound may be the SBR sustainable polymer and the NR sustainable polymer.

To maximize the sustainable content of the rubber compound, in exemplary embodiments, sustainable rubber polymers compose the entire base rubber component of the compound (e.g., 100 phr), or the majority (e.g., greater than 50%) of the base rubber component of the compound, or at least about 75% of the base rubber component of the compound. In certain embodiments, SBR sustainable polymer(s) compose the entire SBR component of the compound, or the majority of the SBR component of the compound, or at least about 75% of the SBR component of the compound.

Plasticizer

The one or more plasticizers in the sustainable rubber compound may increase flexibility, reduce hardness, and improve the processing characteristics of the rubber compound. The plasticizer(s) in the sustainable rubber compound may be of any suitable type or combination of types and may be in any suitable amount(s) as may be desired for the application.

For example, the plasticizer(s) may include an aromatic oil, a paraffinic oil, or a naphthenic oil. For example, the plasticizer oil may be a mineral oil derived from petroleum.

Alternatively or additionally, one or more of the plasticizer(s) may be a sustainable plasticizer derived from a sustainable source. Such sustainable plasticizer(s) may include oils from a renewable source, such as plant oil. Suitable plant oils include, but are not limited to, palm oil, soybean oil, rapeseed oil, sunflower seed, peanut oil, cottonseed oil, palm kernel oil, coconut oil, olive oil, corn oil, grape seed oil, hazelnut oil, oil produced from any nut, hemp oil, linseed oil, rice oil, safflower oil, sesame oil, mustard oil, flax oil, or combinations thereof.

In exemplary embodiments, the one or more plasticizers (e.g., oil) may be present in the sustainable rubber compound in a total amount from about 5 phr to about 20 phr, more particularly about 10 phr to about 20 phr, such as about 5, 10, 15, or 20 phr (including all values and subranges between the stated values). In specific embodiments, only one type of plasticizer (e.g., mineral oil or sustainable oil) is used in the rubber compound in the stated ranges or amounts. If too much total plasticizer is used in the rubber compound, such as greater than the above-identified range(s), then the rubber compound may exhibit excessive softening making it difficult to process, may cause dimensional instability, and may have reduced strength, potentially making it unsuitable for the application such as in a belt. If too little plasticizer is used in the rubber compound, such as less than the above-identified range(s), then the rubber compound may be hard, brittle, and/or have reduced flexibility, potentially making it unsuitable for the application (e.g., belt).

To maximize the sustainable content of the rubber compound, in exemplary embodiments, sustainable oil(s) compose the entire oil component of the compound, or the majority of the oil component of the compound, or at least about 75% of the oil component of the compound. In certain embodiments, the sustainable oil composes the entire plasticizer component of the compound, or the majority of the plasticizer component of the compound, or at least about 75% of the plasticizer component of the compound. In exemplary embodiments, the rubber compound does not contain more than 10 phr, or not more than 5 phr of any plasticizer component other than a sustainable plasticizer (e.g., sustainable oil), such as 0 phr plasticizer other than sustainable plasticizer (e.g., sustainable oil).

Reinforcing Agent/Filler

The one or more reinforcing agents or reinforcing fillers in the sustainable rubber compound may enhance specific characteristics, such as improve the mechanical properties of the rubber compound. The reinforcing filler(s) in the sustainable rubber compound may be of any suitable type or combination of types and may be in any suitable amount(s) as may be desired for the application.

In exemplary embodiments, the sustainable rubber compound contains at least one carbon black as at least one of the reinforcing agents. The carbon black(s) present in the sustainable rubber compound may have any suitable size and may be derived from any suitable source. In certain embodiments, the rubber compound contains only carbon black as the only particle-like reinforcing agent of the rubber compound, or as a majority (>50%) of the particle-like reinforcing agents in the rubber compound.

As an example, the carbon black(s) may be virgin carbon black(s) which traditionally is formed from incomplete combustion of hydrocarbon feedstock. Such carbon blacks can be, for example, furnace black, channel blacks or lamp blacks. These virgin carbon blacks use a naming convention as specified by ASTM D1765 to identify the particular type and size of the carbon black. For N-series carbon blacks, grades range from N110 to N990, in which the first numerical digit designates a mean particle diameter of the carbon black, and the last two numerical digits designate the structural complexity of the carbon black. A lower first digit (e.g., N100-series) has a smaller particle size, and thus higher surface area, than a higher first digit (e.g., N900-series). Generally, finer carbon blacks provide greater reinforcement and increased tensile strength, increased modulus (stiffness), and increased hardness of the rubber compound. Accordingly, the type(s) of the carbon black(s) utilized may affect the amount(s) to achieve the desired properties for the application.

In some embodiments, the sustainable rubber compound may contain at least two types of carbon black in a range between N300-series and N700-series. For example, a first (coarser) carbon black may have size and properties in an N500-series to N700-series range, and a second (finer) carbon black may have a size and properties in an N300-series to N500-series range. The first coarser (e.g., N700-series) carbon black may be present in the rubber compound in an amount from about 25 phr to about 100 phr, more particularly from about 30 to about 60 phr. The finer carbon black (e.g., N500-series) may be present in the rubber compound in an amount from about 25 phr to about 100 phr, more particularly from about 30 to about 60 phr.

Alternatively or additionally to containing one or more virgin carbon blacks, the sustainable rubber compound may include one or more sustainable carbon blacks sourced from sustainable material. For example, the sustainable carbon black may be a recovered carbon black (rCB) sourced from recycled rubber material. Such recycled material can include reclaimed or recycled vulcanized rubber, including from reclaimed rubber articles such as tire, conveyor belt, power transmission belt, rubber hose, roofing material, or the like. Such recovered carbon black may be obtained by a pyrolysis process or other methods known for obtaining recovered carbon black. Other sustainable practices also may be employed for producing sustainable carbon black, such as bio-derived processes.

In certain embodiments, one or more recovered carbon blacks may be present in different sizes and/or types, or the entire rCB content may be present in one size and/or type. Unlike virgin carbon black, recovered carbon black does not use the same N-number designation system according to ASTM D1765. However, the rCB still may have at least an equivalent mean particle size as N-series designated virgin carbon black, and thus rCB may be designated as such N-series equivalent. In exemplary embodiments, the one or more rCBs may have a mean particle size that is in a range equivalent to a particle size range of N300-series carbon black (e.g., about 20 to 50 nm) to N700-series carbon black (e.g.,), more particularly a mean particle size that is in a range equivalent to a particle size range of N500-series carbon black (e.g., about 40 to 60 nm) to N700-series carbon black (e.g. about 80 to 100 nm)). For example, at least one rCB may have mean particle size equivalent to an N700-series carbon black, such as equivalent to an N762 carbon black. As an example, such an N700 equivalent rCB may have an oil absorption number (OAN) range between about 60 to about 110 ml/100 g (e.g., target of about 85 ml/100 g), according to ASTM D2414; and a BET surface area range between about 40 to about 80 $m^2/g$ (e.g., target of about 60 $m^2/g$), according to ASTM D6556. Alternatively or additionally, in exemplary embodiments, the at least one rCB mean particle size may be equivalent to an N500-series carbon black, such as equivalent to an N550 carbon black. As an example, such an N550 equivalent recovered carbon black may have OAN in a range between about 100 to about 140 ml/100 g (e.g., target of about 120 ml/100 g), according to ASTM D224; and a specific surface area (STSA) in a range from about 20 to about 50 $m^2/g$ (e.g., about 40 $m^2/g$), according to ASTM D6556.

The total rCB content (e.g., N300 to N700 size equivalent, such as N550 size equivalent and/or N762 size equivalent) may be present in the sustainable rubber compound in an amount from about 25 phr to about 200 phr, more particularly from about 50 phr to about 175 phr, more particularly from about 75 phr to about 150 phr, more particularly from about 90 to about 120 phr, such as about 50, 60, 70, 80, 90, 100, 110, 120, 140, 160, 180, or 200 phr. For example, in certain embodiments, the N550 equivalent rCB may be present in the sustainable rubber compound in an amount from about 50 phr to about 200 phr, more particularly from about 75 phr to about 125 phr, such as about 100 phr. The N550 equivalent rCB may be the only carbon black present in the compound, or may be the only carbon black of this size present in the compound. In some embodiments, the N762 equivalent rCB may be present in an amount from about 25 phr to about 100 phr, more particularly from about 30 phr to about 75 phr, such as about 50 phr. The N762 equivalent rcB may be combined with finer carbon black, such as an N550 virgin carbon black in the same range(s) as the N762 equivalent rCB, or with another rCB. It is understood that the foregoing ranges include all values and ranges between the stated values.

If the rCB content is too high, such as greater than the above-identified range(s), then the rubber compound may become excessively stiff, hard, and rigid to be suitable for use in an article such as belt. The opposite is the case if the rCB content is too low, such as less than the above-identified range(s), which may result in too much elongation and/or too low of modulus or tensile strength to be suitable for use in an article such as belt. As described in further detail below, it was found that an exemplary rCB having N550 size equivalency exhibited different properties than N550 virgin carbon black, and thus was not a direct substitution, and thus the above-identified quantities of such rCB(s) as described above may provide suitable properties for an article such as belt.

To maximize the sustainable content of the sustainable rubber mixture, in exemplary embodiments, the recovered carbon black composes the entire carbon black component of the compound, or at least 50% or the majority (>50%) of the carbon black component of the compound, or at least about 75% of the carbon black component of the compound. In certain embodiments, the recovered carbon black composes the entire reinforcing particle filler component of the compound, or the majority of the reinforcing particle filler component of the compound, or at least about 75% of the reinforcing particle filler component of the compound. In exemplary embodiments, the rubber compound does not contain more than about 50, 25, or 20 phr of any carbon black other than recovered carbon black, more particularly not more than 10 phr, or not more than 5 phr, or not more than 1 phr of any carbon black other than recovered carbon black, such as 0 phr carbon black other than recovered carbon black.

Dispersed Reinforcing Fiber

The one or more reinforcing fibers dispersed in the rubber compound may enhance tensile strength, reduce elongation, increase tear resistance, and abrasion resistance. The reinforcing fiber(s) in the sustainable rubber compound may be of any suitable type or combination of types and may be in any suitable amount(s) as may be desired for the application. For example, the reinforcing fiber(s) may be a natural material (e.g., cotton, hemp, etc.) or a synthetic material (e.g., aramid, polyester, nylon, etc.). The reinforcing fiber(s) may be chopped, spun or provided via another technique to provide the desired length for being dispersed in the rubber compound.

In exemplary embodiments, the size of the reinforcing fiber(s) (e.g., cotton fiber) is in a range from about 2 mm to about 10 mm, such as about 3 mm to 7 mm. The reinforcing fiber(s) (e.g., cotton fiber) may be present in the sustainable rubber compound in an amount from about 5 phr to about 25 phr, more particularly from about 10 phr to about 20 phr, such as about 5, 10, 15, 20, or 25 phr (including all values and ranges between the stated values). If the reinforcing fiber is present in too high of a quantity, such as greater than the above-identified range(s), then the material may be too difficult to process and flow. If the reinforcing fiber is present in too low of a quantity, such as less than the above-identified range(s), then the material may not have sufficient reinforcement to achieve the desired properties, such as for a belt.

To maximize the sustainable content of the sustainable rubber mixture, in exemplary embodiments, the natural (sustainable) reinforcing fiber (e.g., cotton) composes the entire reinforcing fiber component of the compound, or the majority of the reinforcing fiber component of the compound, or at least about 75% of the reinforcing component of the compound. In exemplary embodiments, the rubber compound does not contain more than 10 phr, or not more than 5 phr, or not more than 1 phr of any reinforcing fiber other than sustainable reinforcing fiber (e.g., cotton), such as 0 phr reinforcing other than sustainable reinforcing fiber (e.g., cotton).

Activator/Accelerator

The one or more activators help activate the curing system and promotes the formation of crosslinks between polymer chains during vulcanization. Any suitable activator(s) or combination of activator(s) in any suitable quantity may be utilized in the sustainable rubber compound.

For example, suitable activator(s) may include a stearic acid, zinc oxide, carbamate, thiazole, sulfide, and/or sulfenamide.

In exemplary embodiments, one or more of the activators are sustainable activator(s) made from sustainable sources. For example, the stearic acid may be a sustainable stearic acid derived from vegetable oils, such as palm oil.

The activator(s) may be present in the rubber compound in a total amount from about 1 phr to about 20 phr, more particularly from about 5 phr to about 10 phr (including all values and ranges between the stated values).

To maximize the sustainable content of the sustainable rubber mixture, in exemplary embodiments, the sustainable stearic acid composes the entire stearic acid component of the compound, or the majority of the stearic acid component of the compound, or at least about 75% of the stearic acid component of the compound. In exemplary embodiments, the rubber compound does not contain more than 5 phr, more particularly not more than 2 phr, or not more than 1 phr of any stearic acid other than sustainable stearic acid, such as 0 phr stearic acid other than sustainable stearic acid.

Antioxidant/Antiozonant

The one or more antioxidants are added to prevent oxidation and degradation of the rubber over time, which can lead to cracking and loss of elasticity. Antiozonants protect rubber from the damaging effects of ozone, which can cause cracking and deterioration. The sustainable rubber compound may contain one or more of such antioxidants and/or antiozonants, which may be provided in any suitable amount. The antioxidant(s) and/or antiozonant(s) may be present in the rubber compound in total in a range from about 1 phr to about 15 phr, more particularly from about 2 phr to about 10 phr, such as about 1, 5, or 10 phr (including all values and subranges been the stated values).

Vulcanizing Agent

The vulcanizing agent(s) or curative(s) are chemicals that cross-link the polymer chains in the base rubber(s), making it more elastic and less prone to deformation. In exemplary embodiments, the vulcanizing agent includes sulfur. The vulcanizing agent(s) (e.g., sulfur) may be present in a total amount from about 1 phr to about 5 phr.

Other Additive

It is understood that the sustainable rubber compound may or may not contain one or more additional additives. To maximize sustainability, however, in exemplary embodiments, the sustainable rubber compound may have a total sustainable content in a range from about 50% to about 100%, such as greater than 50%, greater than 60%, greater than 70%, greater than 80%, greater than 90%, and up to about 95% total sustainable content by weight of the compound. The total sustainable content is calculated based on the total combination of sustainable components (e.g., sustainable rubber, sustainable reinforcing agent, sustainable fiber, sustainable plasticizer, sustainable activator, etc.) and their proportional amount in the compound.

Material Properties

The sustainable rubber compound may have properties that make it particularly suitable for belt applications, such as conveyor belts, power transmission belts, or the like. Accordingly, in exemplary embodiments, the material properties of the sustainable rubber compound may include one or more original properties of: (i) elongation at break of greater than about 70%, more particularly greater than 100%, such as in a range from about 70% to about 300%; (ii) modulus of elasticity at 50% of greater than 500 psi, more particularly greater than 750 psi, such as from about 500 psi to about 1,500 psi; (iii) tensile strength of greater than 500, more particularly greater than about 1,250 psi, such as from about 1,000 psi to about 4,000 psi; (iv) Shore A hardness in a range from about 70 to 90.

The tensile, elongation, and modulus evaluations may be determined by ASTM-D412 at ~25° C. The Shore A hardness evaluation may be determined by ASTM-D2240 at ~25° C. Because of the dispersed fiber content, such values may be "with" the processing direction—i.e., in the direction of fiber, it being understood that such materials may be anisotropic with respect to some properties.

Other Considerations

As shown with exemplary reference to test data described below, each of the SBR sustainable polymer, the recovered carbon black, and the sustainable plasticizer oil may not provide the same material properties as the usual non-sustainable versions of these materials, and thus may not be a direct replacement for the usual non-sustainable versions of these materials. However, in suitable combination(s), such materials can provide positive interactions to be used in the sustainable rubber compound and provide acceptable material properties for use in articles, such as belts.

As an example, use of SBR sustainable polymer may result in lower modulus than non-sustainable SBR. Use of sustainable plasticizer oil may result in lower elongation than non-sustainable plasticizer oil. Use of N550 equivalent rCB may result in lower tensile, lower elongation, and greater modulus than virgin N550 carbon black. However, the combination of SBR sustainable polymer, sustainable plasticizer oil and rCB can provide suitable material properties. Accordingly, in exemplary embodiments, it is understood that a phr ratio of total SBR sustainable polymer(s) to total sustainable plasticizer oil(s) to total finer size rCB(s) (e.g., N300 to N500 equivalent, such as N550 equivalent rCB) (s-SBR: s-Oil: rCB) may be in a range from about 30:50:5 to about 70:200:20, more particularly from about 40:75:10 to about 65:150:20, such as about 60:100:15 (including all values and ranges between the stated values). In such a sustainable rubber compound, the finer rCB (e.g., N300 to N500 equivalent, such as N550 equivalent) may be the only carbon black in the compound. It also is noted that such a rubber compound may be restricted by the total amount of dispersed reinforcing fiber(s) content that can affect material properties to compensate for any detriment cause by sustainable material(s), since increasing the amount of dispersed reinforcing fiber by too much may lead to processing issues, and as such may be limited to no more than 20 phr of the dispersed reinforcing fiber (e.g., cotton fiber) in the sustainable compound, for example.

As another example (also which is described below with exemplary reference to the examples), the sustainable rubber compound may contain non-sustainable plasticizer oil (e.g., paraffinic oil) instead of sustainable oil. In such a case, because of the effect of the SBR sustainable polymer(s) and finer rCB(s) (e.g., N300 to N500 equivalent, such as N550 equivalent), the sustainable rubber compound without the sustainable plasticizer oil may change the carbon black type and content relative to SBR sustainable polymer to achieve suitable results. For example, in exemplary embodiments, the sustainable rubber compound with non-sustainable plasticizer oil may have a phr ratio of total SBR sustainable polymer(s) to total finer virgin carbon black(s) (e.g., N300 to N500, such as N550) to total coarser rCB(s) (e.g., N500 to N700 equivalent, such as N762 equivalent rCB) (s-SBR: CB: rCB) in a range from about 30:25:25 to about 70:75:75, more particularly from about 40:30:30 to about 65:60:60, such as about 60:50:50 (including all values and ranges between the stated values). In such a sustainable rubber compound, the coarser rCB(s) (e.g., N500-N700 equivalent; e.g., N762 equivalent) and the finer virgin carbon black(s) (e.g., N300-N500; e.g., N550) may compose the entire carbon black content in the compound. As noted above, changing the amount of dispersed reinforcing fiber may be limited to no more than 20 phr of the dispersed reinforcing fiber (e.g., cotton fiber) in the sustainable compound, for example.

EXAMPLES

Example rubber compounds were prepared and tested for the purpose of further illustrating the nature of some of the embodiments and aspects of the disclosure and are not intended as a limitation on the scope thereof. These examples are shown in Tables 1-6.

Referring to Table 1, various rubber formulations for different test samples are shown. This includes a baseline rubber compound that is generally non-sustainable (Comparative Example), and other examples (Examples 1-5) in which ingredients were changed to a sustainable version for comparison to the Comparative Example.

TABLE 1

| Ingredient | Unit | Comp. Ex. | Ex. 1 | Ex. 2 | Ex. 3 | Ex. 4 | Ex. 5 |
|---|---|---|---|---|---|---|---|
| Natural Rubber | phr | 40 | 40 | 40 | 40 | 40 | 40 |
| SBR (non-sustainable) | phr | 60 | | 60 | 60 | | |
| SBR (sustainable) | phr | | 60 | | | 60 | 60 |
| Carbon Black (N762) | phr | 50 | 50 | 50 | 50 | | |
| rCB (N762 equiv.) | phr | | | | | | 50 |
| Carbon Black (N550) | phr | 50 | 50 | | 50 | | 50 |
| rCB (N550 equiv.) | phr | | | 50 | | 100 | |
| Plasticizer Oil (non-sustainable) | phr | 15 | 15 | 15 | | | 15 |
| Plasticizer Oil (sustainable) | phr | | | | 15 | 15 | |
| Cotton Fiber | phr | 18.4 | 18.4 | 18.4 | 18.4 | 18.4 | 18.4 |
| Antioxidant(s)/Antiozonant(s) | phr | 4.5 | 4.5 | 4.5 | 4.5 | 4.5 | 4.5 |
| Accelerator(s)/Activator(s) (non-sustainable) | phr | 7.7 | 7.7 | 7.7 | 7.7 | 6.7 | 7.2 |
| Accelerator(s)/Activator(s) (sustainable) | phr | | | | | 1.0 | 1.0 |
| Sulfur Vulcanizing Agent | phr | 1.5 | 1.5 | 1.5 | 1.5 | 1.5 | 1.5 |
| Running Total | phr | 247.1 | 247.1 | 247.1 | 247.1 | 247.1 | 247.6 |

Tables 2-6 show test data from Comparative Example and Examples 1-5. A new comparative (control) compound was created and reevaluated for each experiment. The tensile, elongation, and modulus evaluations were determined by ASTM-D412 at ~25° C. The Shore A hardness evaluation was determined by ASTM-D2240 at ~25° C. The test data represents the original material properties (i.e., without oven aging). The test values indicate testing "with" the processing direction—or generally "with" the direction of the cotton fiber. The results of the Examples were compared against the Comparative Example (baseline) using a T-test in which a value of less than 0.05 was indicative of non-equivalency.

TABLE 2

| Original Material Property | Unit | Comp. Ex. | Ex. 1 | Result |
|---|---|---|---|---|
| Tensile | psi | 1360 | 1320 | equivalent |
| Elongation | % | 140 | 140 | equivalent |
| Modulus @ 10% | psi | 790 | 550 | Non-equivalent |
| Modulus @ 25% | psi | 900 | 720 | Non-equivalent |
| Modulus @ 50% | psi | 1000 | 870 | Non-equivalent |
| Modulus @ 100% | psi | 1220 | 1110 | Non-equivalent |
| Shore A Hardness | | 83 | 81 | equivalent |
| Sustainable Content | % | 24 | 48 | NA |

TABLE 3

| Original Material Property | Unit | Comp. Ex. | Ex. 2 | Result |
|---|---|---|---|---|
| Tensile | psi | 1510 | 1340 | equivalent |
| Elongation | % | 150 | 130 | Non-equivalent |
| Modulus @ 10% | psi | 750 | 780 | equivalent |
| Modulus @ 25% | psi | 770 | 850 | equivalent |
| Modulus @ 50% | psi | 850 | 970 | Non-equivalent |
| Shore A Hardness | | 84 | 84 | equivalent |
| Sustainable Content | % | 24 | 44 | NA |

TABLE 4

| Original Material Property | Unit | Comp. Ex. | Ex. 3 | Result |
|---|---|---|---|---|
| Tensile | psi | 1560 | 1430 | equivalent |
| Elongation | % | 150 | 120 | equivalent |
| Modulus @ 10% | psi | 830 | 800 | equivalent |
| Modulus @ 25% | psi | 830 | 830 | equivalent |
| Modulus @ 50% | psi | 890 | 950 | equivalent |
| Shore A Hardness | | 86 | 87 | equivalent |
| Sustainable Content | % | 24 | 30 | NA |

TABLE 5

| Original Material Property | Unit | Comp. Ex. | Ex. 4 | Result |
|---|---|---|---|---|
| Tensile | psi | 1450 | 1440 | equivalent |
| Elongation | % | 150 | 130 | equivalent |
| Modulus @ 10% | psi | 800 | 780 | equivalent |
| Modulus @ 25% | psi | 830 | 830 | equivalent |
| Modulus @ 50% | psi | 900 | 920 | equivalent |
| Modulus @ 100% | psi | 1140 | 1250 | Non-equivalent |
| Shore A Hardness | | 83 | 84 | equivalent |
| Sustainable Content | % | 24 | 95 | NA |

TABLE 6

| Original Material Property | Unit | Comp. Ex. | Ex. 5 |
|---|---|---|---|
| Tensile | psi | 1270 | 1380 |
| Elongation | % | 160 | 160 |
| Modulus @ 10% | psi | 650 | 750 |
| Modulus @ 25% | psi | 710 | 820 |
| Modulus @ 50% | psi | 820 | 920 |
| Modulus @ 100% | psi | 1030 | 1130 |
| Shore A Hardness | | 81 | 84 |
| Sustainable Content | % | 24 | 61 |

In Example 1, the (non-sustainable) SBR polymer was changed to a SBR sustainable polymer derived from sustainable naphtha which was derived from plant material. As shown in Table 2 with the comparison of Comparative Example 1 (baseline) versus Example 1, the SBR sustainable polymer exhibits a lower modulus than the baseline material. This resulted in a non-equivalent result for the modulus at 10%, 25% and 50%.

In Example 2, the N550 virgin carbon black was changed to a sustainable recovered carbon black equivalent to N550 at least in terms of size. As shown in Table 3 with the comparison of Comparative Example 1 (baseline) versus Example 2, the N550 equivalent recovered carbon black exhibited a lower tensile strength, a higher modulus, and lower elongation than the baseline material. This resulted a lower modulus than the baseline material. This resulted in a non-equivalent result for elongation and modulus at 50%.

In Example 3, the (non-sustainable) plasticizer oil was changed to a sustainable plasticizer oil derived from plant oil. As shown in Table 4 with the comparison of Comparative Example 1 (baseline) versus Example 3, the sustainable plasticizer oil exhibited a lower elongation, but this was determined as being equivalent using the T-test result.

In Example 4, a combination of sustainable materials included the SBR sustainable polymer, the natural rubber, all N550 equivalent recovered carbon black, the sustainable plasticizer oil, and an activator/accelerator was changed to a sustainable activator, namely, a vegetable based stearic acid. The N550 equivalent recovered carbon black had an OAN in a range between about 100 to about 140 ml/100 g (e.g., target of about 120 ml/100 g), according to ASTM D224; and a specific surface area (STSA) in a range from about 20 to about 50 $m^2/g$ (e.g., about 40 $m^2/g$), according to ASTM D6556. As shown in Table 5, with the comparison of Comparative Example 1 (baseline) versus Example 4, it was surprisingly found that the material properties that were previously determined as being non-equivalent in Examples 1-3 were now found to be equivalent. In addition, the values of these material properties were determined to be suitable for use in a belt, in particular an endless power transmission belt.

In Example 5, the sustainable plasticizer oil was changed back to a non-sustainable plasticizer oil, so as to improve on costs of the composition. As such, further modifications were made including changing the recovered carbon black to 50 phr N762 equivalent and changing back to N550 virgin (non-sustainable) carbon black. The N762 equivalent recovered carbon black had an oil absorption number (OAN) range between about 60 to about 110 ml/100 g (e.g., target of about 85 ml/100 g), according to ASTM D2414; and a BET surface area range between about 40 to about 80 $m^2/g$ (e.g., target of about 60 $m^2/g$), according to ASTM D6556. The combination of sustainable materials in Example 5 included the SBR sustainable polymer, the natural rubber, the N762 equivalent recovered carbon black, and the sustainable activator, namely, a vegetable based stearic acid. Results of this testing showed that the properties were suitable for use in a belt, in particular an endless power transmission belt.

According to the understandings of such experimental results, an exemplary sustainable rubber compound having properties suitable for use in a belt may include: one or more natural rubber(s) in a total amount from about 30 phr to about 70 phr, one or more SBR sustainable polymer(s) in a total amount from about 30 phr to about 70 phr, one or more recovered carbon black(s) in a total amount from about 25 phr to about 150 phr, one or more sustainable dispersed reinforcing fiber(s) in a total amount from about 5 phr to about 20 phr, one or more antioxidant(s) in a total amount from about 1 phr to about 10 phr, one or more activator(s) in a total amount from about 4 phr to about 20 phr, and one or more vulcanizing agent(s) (e.g., sulfur) in a total amount from about 1 phr to about 5 phr.

More particularly, according to the understandings of such experimental results, an exemplary sustainable rubber compound having properties suitable for use in a belt may include: one or more natural rubber(s) in a total amount from about 30 phr to about 70 phr, one or more SBR sustainable polymer(s) in a total amount from about 30 phr to about 70 phr, one or more recovered carbon black(s) with a mean size in a range from about 20 nm to about 60 nm and in a total amount from about 50 phr to about 200 phr, one or more sustainable plasticizer oil(s) in a total amount from about 5 phr to about 20 phr, one or more sustainable dispersed reinforcing fiber(s) (e.g., cotton, e.g., sized 2 mm to 7 mm) in a total amount from about 5 phr to about 20 phr, one or more antioxidant(s) in a total amount from about 1 phr to about 10 phr, one or more activator(s) in a total amount from about 4 phr to about 20 phr, and one or more vulcanizing agent(s) (e.g., sulfur) in a total amount from about 1 phr to about 5 phr. The one or more activator(s) may include a sustainable activator (e.g., sustainable stearic acid) in total in a range from about 0.5 phr to about 2 phr.

In certain embodiments, the rubber compound may not contain more than 50 phr of any (non-sustainable) carbon black other than the one or more recovered carbon black(s). A ratio of the total SBR sustainable polymer(s) to the total sustainable plasticizer oil(s) to the total recovered carbon black(s) may be in a range from about 30:50:5 to about 70:200:20, more particularly from about 40:75:10 to about 65:150:20.

In addition, according to the understandings of such results, another exemplary sustainable rubber compound may include: one or more natural rubber(s) in a total amount from about 30 phr to about 70 phr, one or more SBR sustainable polymer(s) in a total amount from about 30 phr to about 70 phr, one or more recovered carbon black(s) with a mean size in a range from about 60 nm to about 100 nm and present in the rubber compound in a total amount from about 25 phr to about 100 phr; one or more additional (e.g., virgin) carbon black(s) having a mean size in a range from about 20 nm to about 60 nm and present in the rubber compound in a total amount from about 25 phr to about 100 phr; one or more plasticizer oil(s) (e.g., mineral oil or paraffinic) in a total amount from about 5 phr to about 20 phr, one or more sustainable dispersed reinforcing fiber(s) (e.g., cotton, e.g., sized 2 mm to 7 mm) in a total amount from about 5 phr to about 20 phr, one or more antioxidant(s) in a total amount from about 1 phr to about 10 phr, one or more activator(s) in a total amount from about 4 phr to about 20 phr, and one or more vulcanizing agent(s) (e.g., sulfur) in a total amount from about 1 phr to about 5 phr. The one or more activator(s) may include a sustainable activator (e.g., sustainable stearic acid) in total in a range from about 0.5 phr to about 2 phr.

In certain embodiments, the rubber compound may not contain more than 50 phr of any (non-sustainable) carbon black other than the one or more recovered carbon black(s) and the additional (e.g., virgin) carbon black(s). A ratio of the total SBR sustainable polymer(s) to the total additional carbon black(s) to the total recovered carbon black(s) may be in a range from about 30:25:25 to about 70:75:75, more particularly from about 40:30:30 to about 65:60:60.

Article Embodiment(s)

Certain embodiments of the disclosure will hereafter be described with reference to the accompanying drawings, in which like reference numerals denote like elements. It should be understood, however, that the accompanying figures illustrate the various implementations described herein and are not meant to limit the scope of various technologies described herein. In addition, it is understood that various aspects and features of these embodiments may be substituted for one another or used in conjunction with one another where applicable. Furthermore, it is understood that the description of material(s) forming the various parts of one embodiment article may be the same material(s) for the same or similar part in another embodiment article, except as otherwise noted below.

Referring to FIG. 1, a power transmission belt 100 is shown in the form of an endless V-belt. The belt 100 includes an elastomeric body 102 having reinforcement cords 104 embedded therein. The elastomeric body 102 includes an inner engagement section 106, an outer section 108, and a load carrying 110 section between the inner section 106 and the outer section 108. The belt 100 is configured to engage with a pulley/sheave and includes at least one drive surface. In the illustrated belt, there are three drive surfaces 112, 114, 116 that are configured to engage within the groove of the pulley/sheave.

The load carrying section 110 includes the reinforcement cords 104 (also referred to as tensile cords) and provides a majority of the tensile strength to the belt. The reinforcement cords 104 may be embedded in an elastomeric cushion or matrix 118 portion of the elastomeric body 102. The reinforcement cords 104 extend generally in the longitudinal direction of the belt. The load carrying section 110 may include one or more plies of such tensile cords 104.

The reinforcement cords 104 may be made of any suitable material or combination of materials and may have any suitable form as may be desired for the particular application. For example, the cords may be formed form yarns having a particular denier and twist. The ply twist may be greater than the yarn twist, and the cord twist may be less than with the yarn or the ply twist. Yarn twist refers to the spiral or helical arrangement of fibers or filaments within a single strand of yarn. Cord twist refers to the twist applied to multiple yarns or strands when they are twisted together to create a thicker, stronger cord. Ply twist is the twist applied to the individual strands or plies before they are twisted together to create a cord or rope. Higher twist values may provide a slightly better flex fatigue to the belt but may reduce the belt modulus. Conversely, lower twist values may increase the belt modulus, but reduce flex fatigue. The yarns and plies may be twisted in the same direction, while the cord may have an opposing twist direction. As such, the cord twists may be either ZZS or SSZ. S-twist refers to the fibers, yarns, or strands are twisted together in a counterclockwise direction. In Z-twist, the fibers, yarns, or strands are twisted together in a clockwise direction.

The material(s) forming the cord may include synthetic, inorganic or natural material. For example, synthetic materials, such as synthetic polymers, may include for example acrylonitrile, polyacrylonitrile, polypropylene, polyester in particular polyethylene terephthalate (PET) or polyethylene 2,6-naphthalate (PEN), polyamide, polyimide, polyurethane, polyphenylene sulfide, polyoxadiazole, aramids, such as p-aramid, m-aramid or copoly-para-aramid, polyimide, polyetherimide, polyetheretherketone, polyethylene 2,6-naphthalate, polyphenylene, polyphenylene oxide, polyphenylene sulfide, polyphenylene ether, polybenzoxazoles, polysulfone, polyvinyl acetal, polyvinyl alcohol. The natural materials may include rockwool or asbestos, cotton, flax or hemp, or wool or silk. Inorganic materials may include glass, ceramic, carbon, metal, for example steel, or mineral, for example basalt. Hybrid designs, for example in the form of a mixed yarn can also be used.

The outer section 110 (also referred to as the cover, backing or spine section) overlies at least the load carrying section 108 and provides protection to the load carrying section 108 having the reinforcement cords. The inner engagement section 106 underlies the load carrying section 108 and experiences compressive load from the pulleys/sheaves or other component of the power transmission system. As such, the inner engagement section 108 is also referred to as a compression section, or cushion section, and distributes load to the reinforcement cords 104. As shown, the inner (cushion) section 106 may constitute a majority of the volume of the belt. The elastomeric body 102 may have a generally trapezoidal shape and the elastomeric nature of the inner engagement section 106 can provide for firm lateral pressure against the sheave/pulley sidewall.

The rubber compounds forming the inner (cushion) section 106, the load carrying section (108) (e.g., matrix 118), and the outer section (110) may be the same or different. Generally, if different rubber compounds are used for one or more of the sections, they are based on the same polymer or polymer blends as each other, although such different rubber compounds may have different proportions of such polymers, and may have different proportions of additives.

As shown, the belt 100 may be provided with one or more fabric layers 120 on one or more sides. In the illustrated embodiment, the belt 100 is wrapped with the fabric layer 120 on all sides. In other embodiments, the fabric reinforcement layer 120 may be at least partially embedded in the cross-linked elastomeric body 102, which may give rise to both the elastomeric body and fabric reinforcement forming an outer surface of the belt. Generally, the fabric reinforcement layer 120 may be provided at least on the drive surface(s) 112, 114, 116 to enhance the mechanical stability of these surfaces and may provide a wear resistant surface to engage pulleys. Alternatively, the belt 100 may be provided without a fabric layer 120 on one or more sides and is referred to as a raw edge belt.

The fabric layer 120 may have any suitable construction, including a bi-directional, non-woven, woven, knitted, or braided fabric. The fabric may include warp and weft threads laid at any desired angle. The fabric layer 120 may be a plated knitted fabric including courses of yarn knitted together. In some embodiments, more than one ply of fabric may be employed. If desired, the fabric may be cut on a bias so that the strands form an angle with the longitudinal direction of travel of the belt 100. The angle may be of any suitable angle, for example, but not limited to 0 or 90 degrees, or any point along the continuum there between.

The fabrics for use in the fabric layer 120 may be formed from any suitable material or combination of materials. For example, the fabrics for use in the fabric layer 120 may be formed from materials including nylon (such as nylon 4,6, nylon 6, 6, and nylon 6), cotton, polyester, cotton/polyester, nylon/polyester, cotton/nylon, aramid, rayon, or the like. Hybrid designs, for example in the form of a mixed fabrics, can also be used.

The fabric in the fabric layer 120 may be coated with an elastomeric material. In some embodiments, the fabric layer may have a different coating on one side to assure that the fabric layer 120 is bonded to the belt section(s) 106, 108, 110 to which it is applied; and may have a different coating on the opposite side to provide low friction and/or abrasion resistance.

As shown in the illustrated embodiment, the drive surfaces 112, 114, 116 may be smooth. However, the inner engagement section 106 of the belt may include longitudinal or transverse grooves or ribs that engage corresponding pulley/sheave grooves in the power transmission system. The outer engagement section 110 also may have grooves or teeth, forming a dual sided belting. The grooves or teeth may be provided as single V-grooved, multi-V-grooved or synchronous in which an inner toothed surface that engages with tooth spaces on the periphery of a mating sprocket.

Figure 2:
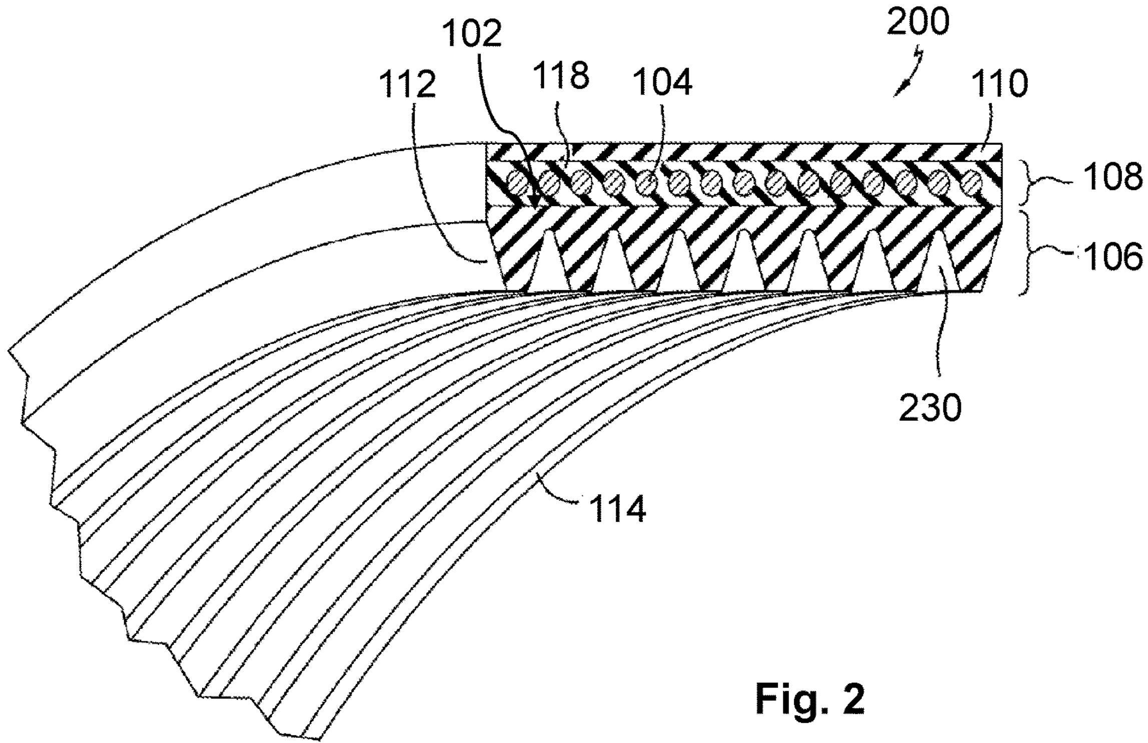
FIG. 2 illustrates a portion of another endless belt in a perspective sectional view, in accordance with an embodiment of the present disclosure.

Turning to FIG. 2, another exemplary embodiment of an endless power transmission belt 200 is shown, which in this embodiment is in the form of a grooved V-belt. The belt 200 includes an elastomeric body 120 having inner (cushion) section 106, load carrying section 108, and outer section 110. The load carrying section includes cords 104 embedded in matrix 118. The inner (cushion) section 106 has a plurality of longitudinal ribs with a plurality of longitudinal grooves 230. The ribs and grooves form drive surfaces 112, 114.

Figure 3:
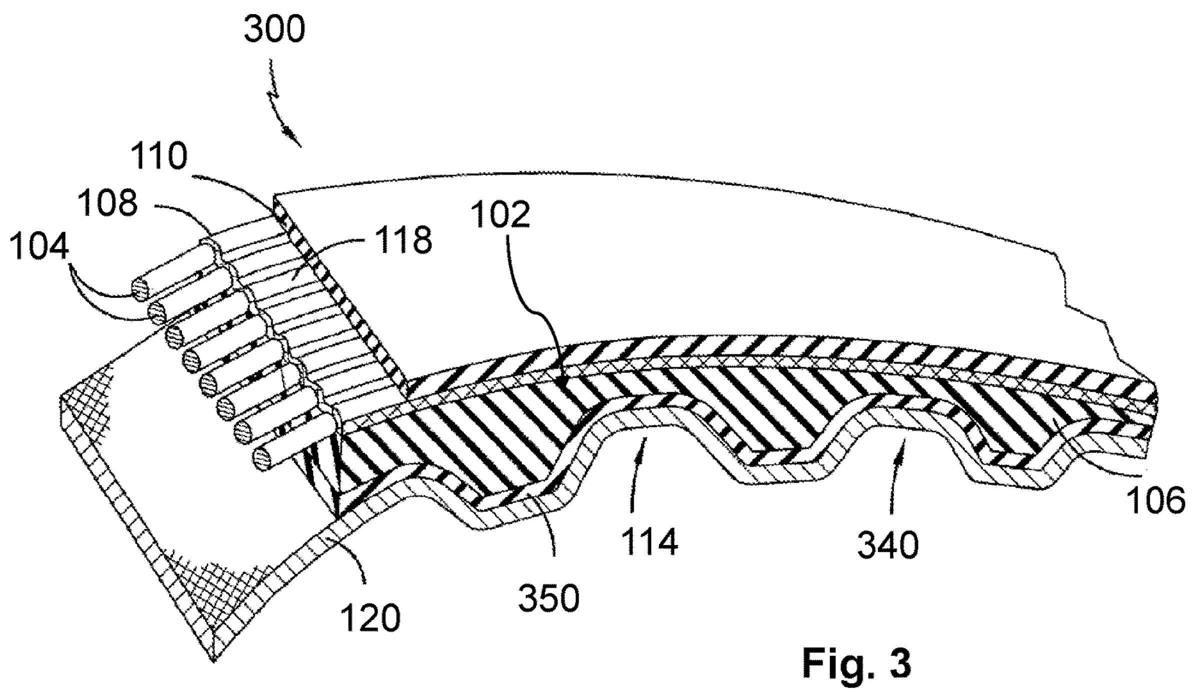
FIG. 3 illustrates a portion of another endless belt in a perspective sectional view, in accordance with an embodiment of the present disclosure.

FIG. 3 illustrates another exemplary embodiment of an endless power transmission belt 10, which is in the form of a timing belt. The belt 300 includes an elastomeric body 120 having inner (cushion) section 106, load carrying section 108, and outer section 110. The load carrying section includes cords 104 embedded in matrix 118. The inner (cushion) section 106 has transverse grooves 340. The belt 300 has fabric layer 120 adhered below the elastomeric inner cushion section 106 to form drive surface 114. The belt 300 may have an insulation layer 350 located between the inner (cushion) section 106 and the fabric layer 120 to prevent or decrease rubber from the inner (cushion) section 106 from permeating through the fabric 120 to the drive surface 114.

Embodiment(s) of the sustainable rubber compound may form one or more of the inner section 106, the load carrying section (e.g., matrix 118), and/or the outer section 110 of the belt(s) 100, 200, 300. Other sections may be made of different polymers or blends, however, the same base polymer (e.g., SBR/NR blend) may be used for compatibility with the sustainable rubber compound to form the belt 100, 200, 300. Such different polymer(s) of the different section(s) of the belt may have any of the polymer(s) or additive(s) in the amount(s) described herein.

To enhance the amount of sustainable content of the overall belt 100, 200, 300, embodiment(s) may have at least the inner (cushion/compression) section 106 of the belt formed from an embodiment of the sustainable rubber compound. This is because the inner (cushion) section 106 may form a major portion of the elastomeric body 102. In exemplary embodiments, the elastomeric of each of the inner section 106, load carrying section 106, and outer section 110 are formed from embodiment(s) of the sustainable rubber compound, which may be the same sustainable rubber compound or different sustainable rubber compounds. The elastomeric of the fabric layer 120, if provided, also may be formed from an embodiment of the sustainable rubber compound, which may be the same or different from the sections 106, 108, 110.

To further enhance the sustainability of the overall belt 100, 200, 300, the reinforcing cords 140 also may be formed from sustainable material. For example, the cords 140 may be formed from recycled polyethylene terephthalate (PET) material. The matrix 118 also may be formed from an embodiment of the sustainable rubber compound, thereby providing a high sustainable content of the load carrying section 108 of the belt.

In addition, the fabric of the fabric layer 120 also may be formed from sustainable material. For example, the fabric may be formed from recycled PET, or from cotton, or a blend of cotton and recycled PET. The coating of the fabric layer 120. The elastomeric coating of the fabric layer 120 may be formed from chloroprene rubber, which is non-sustainable, yet the fabric layer 120 may still have a high sustainability content, such as about 95% sustainable.

In exemplary embodiments, the overall sustainable content of the belt 100, 200, 300 has a total sustainable content in a range from about 50% to about 100%, such as greater than 50%, greater than 60%, greater than 70%, greater than 80%, greater than 90%, and up to about 95% sustainable content by weight based upon total belt weight.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. Thus, while a particular feature may have been described with respect to only one or more of several embodiments, such feature may be combined with one or more other features of the other embodiments, separately or in any combination. The same may also be varied in many ways. Such variations are not to be regarded as a departure from the disclosure, and all such modifications are intended to be included within the scope of the disclosure. as may be desired and advantageous for any given or particular application.

Any background information contained in this disclosure is to facilitate a better understanding of the various aspects described herein. It should be understood that any such background statements are to be read in this light, and not as admissions of prior art. Likewise, the description and examples are presented herein solely for the purpose of illustrating the various embodiments of the disclosure and should not be construed as a limitation to the scope and applicability of the disclosure.

The phrase "and/or" as used in this disclosure should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" as used in this disclosure should be understood as being inclusive and not exclusive. For example, when separating items in a list, "or" or "and/or" shall be interpreted as being inclusive, i.e., the inclusion of at least one, but also including more than one, of a number or list of elements, and, optionally, additional unlisted items. For example, a condition A or B is satisfied by anyone of the following: A is true (or present) and B is false (or not present), A is false (or not present) and B is true (or present), and both A and B are true (or present). Only terms clearly indicating exclusivity should be interpreted as indicating exclusive alternatives (i.e. "one or the other but not both"), such as "either," "only one of," or "exactly one of." In other words, such terms of exclusivity refer to the inclusion of exactly one element of a number or list of elements.

Any references to "one embodiment" or "an embodiment" as used herein is understood to mean that a particular element, feature, structure, or characteristic described in connection with the embodiment is included in at least one embodiment. The appearances of the phrase "in one embodiment" in various places in the specification are not necessarily referring to the same embodiment.

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The word "exemplary" is used herein to mean "serving as an example or illustration." Any aspect or design described herein as "exemplary" is not necessarily to be construed as preferred or advantageous over other aspects or designs. Likewise, the phrases "particularly," "preferably," or the like as used in this disclosure may refer to an element or value that provides advantage(s) in some embodiment(s), however is not intended to limit the scope of the disclosure to those "particular" or "preferable" features.

Transitional language such as "including," "comprising," "having," "containing," "involving," or variations thereof, is intended to be broad and encompass the subject matter listed thereafter, equivalents, and additional subject matter not recited, i.e., to be open-ended and meaning including but not limited to.

It is to be understood that terms such as "top," "bottom," "upper," "lower," "left," "right," "front," "rear," "forward," "rearward," or the like may refer to an arbitrary frame of reference, rather than to the ordinary gravitational frame of reference.

It is to be understood that all values, ranges, ratios or the like as described in this disclosure may be combined in any manner. In addition, it is to be understood that a concentration or amount or value range listed in this disclosure is intended to include any and every concentration or amount or value within the range, including the end points, as if each value within the range has been expressly stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that the inventor(s) appreciate and understand that any and all data points within the range are to be considered to have been specified, and that inventor(s) had possession of the entire range and all points within the range.

In addition, each numerical value used in this disclosure should be read once as modified by the term "about" (unless already expressly so modified), and then read again as not so modified unless otherwise indicated in context. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values. When the term "about" is used in describing a value or an end-point of a range, the disclosure should be understood to include the specific value or end-point referred to.

The term "consisting essentially of" in relation to a composition is to indicate that substantially (e.g., greater than 95 weight % or greater than 99 weight %) of the component(s) present in the composition is the component(s) recited. Therefore, this term does not exclude the presence of minor additives or impurities as would be understood by those having ordinary skill in the art.

Although the invention has been shown and described with respect to a certain embodiment or embodiments, it is apparent that equivalent alterations and modifications will occur to those having ordinary skill in the art upon the reading and understanding this disclosure, and such modifications are intended to be included within the scope of this disclosure as defined in the claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure.

LIST OF REFERENCE NUMERALS (PART OF THE SPECIFICATION)

100, 200, 300 Belt
102 Elastomeric body
104 Tensile cords
106 Inner section
108 Load carrying section
110 Outer section
112, 114, 116 Drive surfaces
120 Fabric layer
230 Longitudinal groove
340 Transverse groove
350 Insulation layer

What is claimed is:

1. A belt comprising:
an elastomeric body; and
at least one reinforcement cord disposed in the elastomeric body;
wherein at least part of the elastomeric body is formed from a rubber compound comprising one or more styrene butadiene rubber (SBR) sustainable polymer(s), wherein a sustainable polymer is a renewable and/or a recycled polymer.

2. The belt according to claim 1, wherein:
the one or more SBR sustainable polymer(s) includes styrene and/or butadiene monomer derived from sustainable naphtha.

3. The belt according to claim 1, wherein:
the one or more SBR sustainable polymer(s) is present in a total amount from 30 phr to 70 phr.

4. The belt according to claim 1, wherein:
the rubber compound contains a total sustainable polymer content in an amount from 80 phr to 100 phr, inclusive of the one or more SBR sustainable polymer(s).

5. The belt according to claim 1, wherein:
the rubber compound includes one or more additional sustainable materials, including one or more: natural rubber(s), sustainable carbon black(s), sustainable dispersed reinforcing fiber(s), sustainable plasticizer(s), and/or sustainable activator(s).

6. The belt according to claim 5, wherein:

the rubber compound includes one or more natural rubber(s) in a total amount from 30 phr to 70 phr;

wherein the total amount of the one or more natural rubber(s) is less than the total amount of the one or more SBR sustainable polymer(s).

7. The belt according to claim 5, wherein:

the rubber compound includes one or more sustainable dispersed reinforcing fiber(s) in a total amount from 5 phr to 25 phr.

8. The belt according to claim 5, wherein:

the rubber compound includes one or more sustainable plasticizer oil(s) in a total amount from 5 phr to 20 phr.

9. The belt according to claim 5, wherein:

the rubber compound includes one or more sustainable carbon black(s), in particular one or more recovered carbon black(s), in a total amount from 25 phr to 200 phr.

10. The belt according to claim 1, wherein the rubber compound includes:

(i) the one or more SBR sustainable polymer(s) in a total amount from 30 phr to 70 phr;

(ii) one or more natural rubber(s) in a total amount from 30 phr to 70 phr, the total amount of the one or more natural rubber(s) being less than the total amount of the one or more SBR sustainable polymer(s);

(iii) one or more sustainable plasticizer oil(s) in a total amount from 5 phr to 20 phr; and (iv) one or more sustainable carbon black(s), in a total amount from 50 phr to 200 phr, the one or more sustainable carbon black(s) having a mean size in a range from 20 nm to 60 nm, and (v) no more than 50 phr of any carbon black other than the one or more sustainable carbon black(s);

wherein a ratio of the total SBR sustainable polymer(s) to the total sustainable plasticizer oil(s) to the total sustainable carbon black(s) is in a range from 30:50:5 to 70:200:20.

11. The belt according to claim 1, wherein the rubber compound includes:

(i) the one or more SBR sustainable polymer(s) in a total amount from 30 phr to 70 phr;

(ii) one or more natural rubber(s) in a total amount from 30 phr to 70 phr, the total amount of the natural rubber(s) being less than the total amount of SBR sustainable polymer(s);

(iii) at one or more non-sustainable plasticizer oil(s) in an amount from 5 phr to 20 phr; and (iv) one or more sustainable carbon black(s) in a total amount from 25 phr to 100 phr, the one or more sustainable carbon black(s) having a mean size in a range from 60 nm to 100 nm, (v) one or more additional carbon black(s) in a total amount from 25 phr to 100 phr, the additional carbon black(s) having a mean size in a range from 20 nm to 60 nm, (vi) no more than 50 phr of any carbon black other than the sustainable carbon black(s) and the additional carbon black(s);

wherein a ratio of the total SBR sustainable polymer(s) to the total additional carbon black(s) to the total sustainable carbon black(s) is in a range from 30:25:25 to 70:75:75.

12. The belt according to claim 1, wherein the rubber compound:

(i) has a total sustainable material content, inclusive of the SBR sustainable polymer(s), of at least 50% and/or up to 95%, based on weight of the compound; and/or (ii) has a total sustainable polymer content, inclusive of the SBR sustainable polymer(s), of at least 50% and/or up to 95%, based on weight of the compound; and/or (iii) does not contain more than 10 phr, or not more than 5 phr of any plasticizer oil other than sustainable plasticizer oil(s); and/or (iv) does not contain more than 50 phr, or not more than 20 phr of any carbon black other than sustainable carbon black(s); and/or (v) does not contain more than 10 phr, or not more than 5 phr, or not more than 1 phr of any dispersed reinforcing fiber other than sustainable dispersed reinforcing fiber(s).

13. The belt according to claim 1, wherein the rubber compound has:

(i) elongation at break in a range from 70% to 300%; and/or (ii) modulus of elasticity at 50% from 500 psi to 1,500 psi; and/or (iii) tensile strength from 1,000 psi to 4,000 psi; and/or (iv) Shore A hardness in a range from 70 to 90.

14. The belt according to claim 1, wherein:

the rubber compound forms at least a majority of the elastomeric body;

the at least one reinforcement cord being formed from sustainable material; and the belt has a total sustainable content of greater than 50% and/or up to 95% sustainable content by weight based upon total belt weight.

15. The belt according to claim 1, wherein one or more natural rubber(s) is/are present in a total amount from 30 phr to 70 phr;

the one or more SBR sustainable polymer(s) is/are present in a total amount from 30 phr to 70 phr, one or more sustainable carbon black(s) is/are present in an amount from 25 phr to 125 phr, one or more sustainable dispersed reinforcing fiber(s) is/are present in a total amount from 5 phr to 20 phr.

16. The belt according to claim 1, wherein:

the rubber compound is a first rubber compound of the elastomeric body that forms at least a first section of the elastomeric body and has a first sustainable content;

the elastomeric body further comprising a second rubber compound including one or more styrene butadiene rubber (SBR) sustainable polymer(s), the second rubber being different from the first rubber compound and having a second sustainable content, the second compound forming at least a second section of the elastomeric body that is different from the first section;

a combined total of the first sustainable content and second sustainable content is an amount of greater than 50% by weight based upon total belt weight.

17. A rubber compound comprising:

one or more natural rubber(s) in a total amount from 30 phr to 70 phr;

one or more SBR sustainable polymer(s) in a total amount from 30 phr to 70 phr, one or more sustainable carbon black(s) in a total amount from 25 phr to 150 phr, one or more sustainable dispersed reinforcing fiber(s) in a total amount from 5 phr to 20 phr, optionally, one or more antioxidant(s) in a total amount from 1 phr to 10 phr, and optionally, one or more activator(s) in a total amount from 4 phr to 20 phr, wherein a sustainable polymer is a renewable and/or a recycled polymer.

18. The rubber compound according to claim 17, further comprising one or more sustainable plasticizer oil(s) in a total amount from 5 phr to 20 phr, wherein the one or more sustainable dispersed reinforcing fiber(s) includes cotton having a mean size in a range from 2 mm to 7 mm, wherein the one or more sustainable carbon black(s) has a mean size in a range from 20 nm to 60 nm and is present in the rubber compound in a total amount from 75 phr to 150 phr.

19. The rubber compound according to claim 17, further comprising one or more non-sustainable plasticizer oil(s) in a total amount from 5 phr to 20 phr, wherein the one or more sustainable dispersed reinforcing fiber(s) includes cotton having a mean size in a range from 2 mm to 7 mm, wherein the one or more sustainable carbon black(s) has a mean size in a range from 60 nm to 100 nm and is present in the rubber compound in a total amount from 25 phr to 100 phr;

the compound further comprising one or more additional carbon black(s) having a mean size in a range from 20 nm to 60 nm and is present in the rubber compound in a total amount from 25 phr to 100 phr.

20. The rubber compound according to claim 17, having:

(i) elongation at break in a range from 70% to 300%; and/or (ii) modulus of elasticity at 50% from 500 psi to 1,500 psi; and/or (iii) tensile strength from 1,000 psi to 4,000 psi; and/or (iv) Shore A hardness in a range from 70 to 90.

* * * * *